(12) United States Patent
Kuo

(10) Patent No.: US 7,575,678 B2
(45) Date of Patent: Aug. 18, 2009

(54) PORTABLE WATER PURIFICATION DEVICE

(75) Inventor: Chi-Chang Kuo, Taichung (TW)

(73) Assignee: New Century Membrane Co., Ltd., Taichung (TW)

( * ) Notice: Subject to any disclaimer, the term of this patent is extended or adjusted under 35 U.S.C. 154(b) by 106 days.

(21) Appl. No.: 11/942,108

(22) Filed: Nov. 19, 2007

(65) Prior Publication Data
US 2009/0127178 A1 May 21, 2009

(51) Int. Cl.
*C02F 1/28* (2006.01)
*C02F 1/42* (2006.01)
*C02F 9/02* (2006.01)
*B01D 27/08* (2006.01)
*B01D 27/14* (2006.01)
*B01D 29/54* (2006.01)

(52) U.S. Cl. .............. 210/232; 210/238; 210/244; 210/266; 210/282; 210/321.84; 210/347

(58) Field of Classification Search ............... 210/232, 210/238, 244, 266, 282, 321.84, 347
See application file for complete search history.

(56) References Cited

U.S. PATENT DOCUMENTS

| | | | | | |
|---|---|---|---|---|---|
| 1,120,229 | A | * | 12/1914 | Nieman | 210/239 |
| 1,483,498 | A | * | 2/1924 | Zolnerevich | 210/244 |
| 3,823,824 | A | * | 7/1974 | Close | 210/86 |
| 4,529,511 | A | * | 7/1985 | Breeden et al. | 210/94 |
| 6,129,841 | A | * | 10/2000 | Dann | 210/255 |

* cited by examiner

*Primary Examiner*—Thomas M Lithgow
(74) *Attorney, Agent, or Firm*—Shia Banger

(57) ABSTRACT

A portable water purification device includes a base, a fixed sleeve, a tube, a filtering unit, and a movable sleeve. The base includes a channel for providing filtered liquid. The fixed sleeve is fixed on the base and includes a first peripheral wall and a first axial hole. The tube on where the filtering unit is mounted is secured on the base and held in the first axial hole to define a penetrated hole communicating with the channel. The movable sleeve is mounted on an external surface of the fixed sleeve, and slid between a first position away from the base and a second position adjacent to the base. The movable sleeve includes a second peripheral wall and a second axial hole whereby the first axial hole communicates with the second axial hole to define a containing room when the movable sleeve is located on the first position.

12 Claims, 8 Drawing Sheets

PORTABLE WATER PURIFICATION DEVICE

BACKGROUND

1. Field of Invention

The present invention relates to a water purification device, and more particularly to a portable water purification device without power supply, and the water purification device is convenient for storage.

2. Description of Related Art

There are numerous known water treatment devices used to filter particle suspension, organisms, bacteria, and mineral matter, but most of these devices need to be connected with a power supply for filtration process through pump effect. Therefore, these devices are too heavy and bulky for human requiring constant transportation to carry. Besides, these devices can barely be moved because of the huge predetermined volume.

Furthermore, there are also individual water-treatment devices of the "filtering candle" type suitable for eliminating micro-organisms, but these devices are fragile and hardly eliminate the mineral matter or organic materials dissolved in the water to be filtered.

As a result, providing a water purification device without power supply and capable of being carried by human becomes the aim of the present invention.

SUMMARY

It is therefore an aspect to provide a portable water purification device without power supply to filter fluid.

It is therefore another aspect to provide a portable water purification device with retractable and flexible sleeves to solve inconvenient carrying problems of a conventional water purification device.

It is therefore another aspect to provide a portable water purification device wherein the raw water is softened by the pre-filtering unit through natural gravity, and then filtered by the membranes with μm bore diameter of the filtering bags to generate purified fluid.

In accordance with an embodiment of the present invention, the portable water purification device includes a base, a fixed sleeve, a tube, a filtering unit, and a movable sleeve.

The base includes a channel for providing filtered liquid. The fixed sleeve is fixed on the base and includes a first peripheral wall around an axis to define a first axial hole. The tube is secured on the base and held in the first axial hole based on the axis to define a penetrated hole communicating with the channel. The tube includes an encircled wall and multiple bores defined on the encircled wall and communicating with the penetrated hole. The filtering unit includes multiple filtering bags mounted on the tube wherein each of the filtering bags has an intake communicating with the bores. The movable sleeve is mounted on an external surface of the fixed sleeve, and slid between a first position away from the base and a second position adjacent to the base. The movable sleeve includes a second peripheral wall around the axis to define a second axial hole whereby the first axial hole communicates with the second axial hole to define a containing room when the movable sleeve is located on the first position.

The portable water purification device further includes a pre-filtering unit set in the containing room and above the filtering unit to soften the raw water poured into the containing room.

The portable water purification device further includes an exhaust unit associated with the tube, and composed of multiple sections connected and communicated with each other for air exhaust.

As a result, the portable water purification device of the present invention can be operated without a power supply to filter fluid by pump effect. Besides, the raw water is softened by the pre-filtering unit in the first stage, and is filtered by the filtering unit of μm bore diameter in the second stage to provide purified liquid. Furthermore, the retractable sleeve is convenient for human to store and carry.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
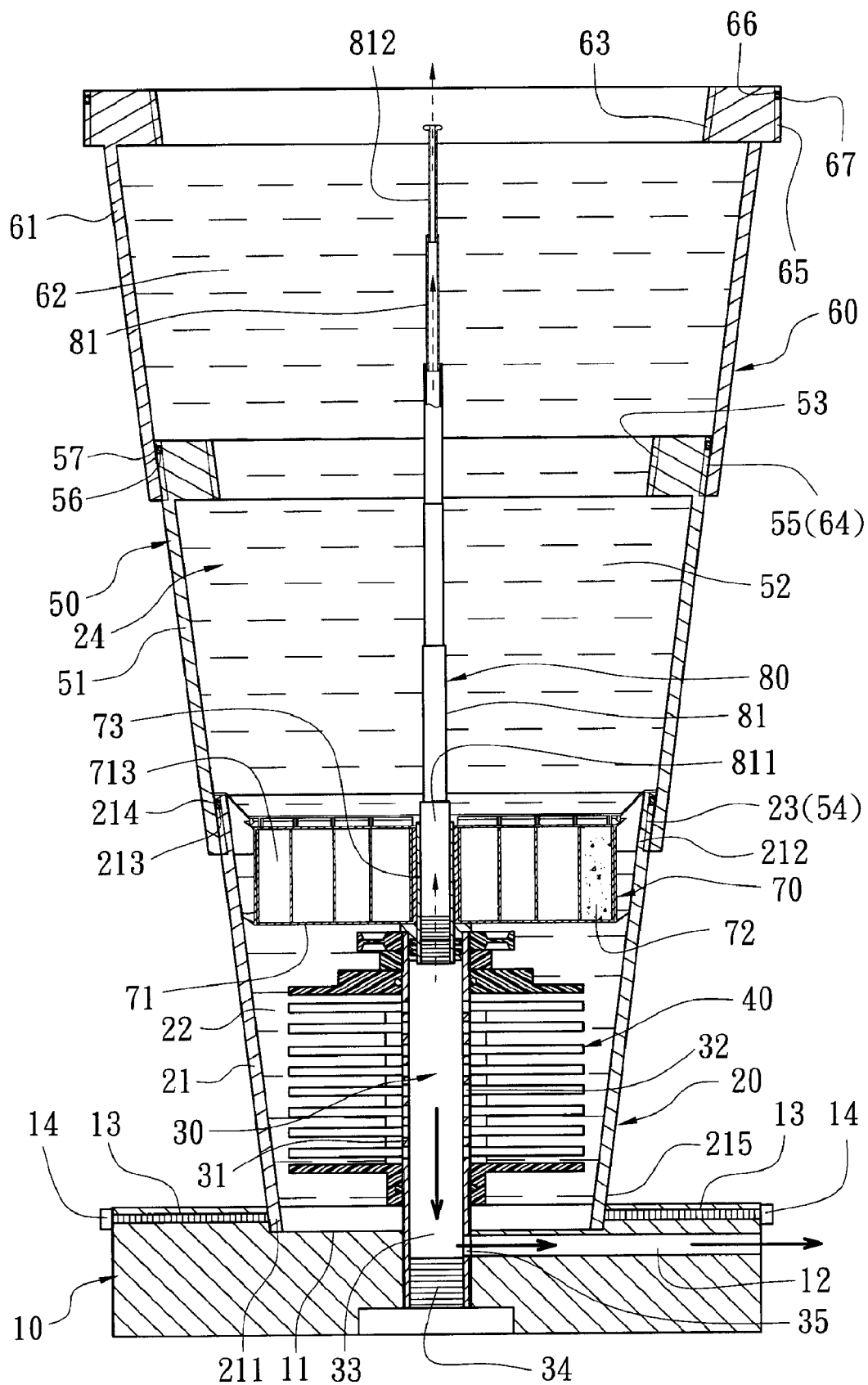
FIG. 1 is a sectional view of a water purification device of a first embodiment in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

Refer to FIG. 1. The portable water purification device of the first embodiment includes a base 10, a first sleeve 20, a tube 30, a filtering unit 40, two movable sleeves 50 and 60, a pre-filtering unit 70, and an exhaust unit 80.

The base 10 includes an indentation 11, a channel 12, and multiple threaded holes 13. The channel 12 is extended outward beneath the indentation 11. The threaded holes 13 are defined on the base 10 and communicate with the indentation 11.

The first sleeve 20 is fixed within the indentation 11 of the base 10 by fastening the screws 14 in the threaded holes 13 and against the first sleeve 20. The first sleeve 120 includes a first peripheral wall 21 around an axis to define a first axial hole 22. The first peripheral wall 21 has a fixed segment 211 and a linked segment 212 defined on opposite ends of the first sleeve 120 wherein the linked segment 212 has a diameter larger than that of the fixed segment 211. The fixed segment 211 is adjacent to the base 10, and the linked segment 212 is away from the base 10 and has a groove 213 being adapted to receive a sealing ring 214.

The tube 30 is secured on the base 10 by a fastener 34 and held in the first axial hole 22 based on the axis to define a penetrated hole 33. The tube 30 includes an encircled wall 31, multiple bores 32, and an aperture 35. The bores 32 are defined on the encircled wall 31 and communicating with the penetrated hole 33. The penetrated hole 33 of the tube 30 communicates with the channel 12 of the base 10 through the aperture 35 whereby a water regulation device may be set on the channel 12 to provide filtered fluid.

Figure 5:
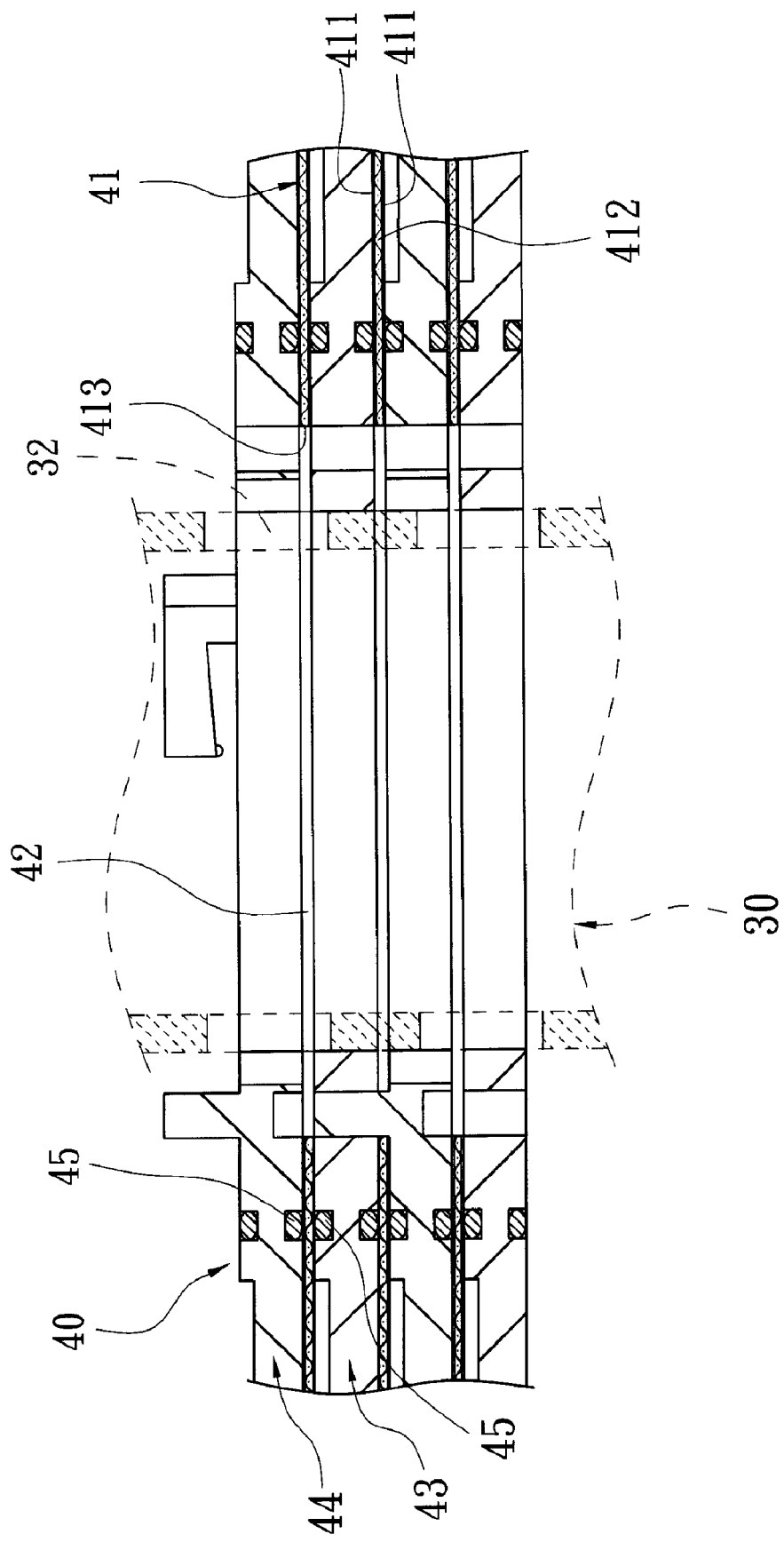
FIG. 5 is a partial sectional view of the filtering unit of the water purification device in accordance with FIG. 1.

Refer to FIG. 5. The filtering unit 40 includes multiple filtering bags 41, multiple buckle members 43 and 44, and multiple sealing rings 45. The filtering bags 41 are mounted on the tube 30 with water-tightness wherein each filtering bag 41 includes an intake 42 communicating with the bore 32, a supporting net 412, two membranes 411 sandwiching the supporting net 412 by thermal melt-jointing adjacent membrane edges, and an exit 413 communicating with the bore 32. The buckle members 43 and 44 clamp filtering bags 41 wherein the sealing rings 45 are clamped between the filtering bag 41 and the buckle members 43 and 44. In this embodiment, the membranes 411 are made of polyvinylidene fluoride (PVDF), and have 0.1-0.01 μm bore diameter. The supporting net 412 has intercrossed ribs thereby providing a passageway between the membranes 411 and the supporting net 412 being adapted to conduct the fluid passing through the membrane 411 toward the intake 42.

Refer to FIG. 1. The movable sleeve 50 is mounted on the linked segment 212 of the first sleeve 20, and includes a second peripheral wall 51, a second axial hole 52, an internal thread portion 53 and 54, an external thread portion 55, and a groove 56. The second axial hole 52 is defined by the second peripheral wall 51. The internal thread portion 53 is formed on the upper inner wall of the second peripheral wall 51, and the internal thread portion 54 is formed on the lower inner wall of the second peripheral wall 51. The external thread portion 55 is formed on the upper outer wall of the second peripheral 51 wherein the groove 56 is formed on the external thread portion 55 for receiving a sealing ring 57.

The movable sleeve 60 is mounted on the movable sleeve 50, and includes a third peripheral wall 61, a third axial hole 62, an internal thread portion 63 and 64, an external thread portion 65, and a groove 66. The third axial hole 62 is defined by the third peripheral wall 61. The internal thread portion 63 is formed on the upper inner wall of the third peripheral wall 61, and the internal thread portion 64 is formed on the lower inner wall of the third peripheral wall 61. The external thread portion 65 is formed on the upper outer wall of the third peripheral wall 61 wherein the groove 66 is formed on the external thread portion 65 for receiving a sealing ring 67.

In the first position of using situation shown in FIG. 1, the internal thread portion 54 of the movable sleeve 50 is engaged with an external thread portion 23 of the first sleeve 20, and the internal thread portion 64 of the movable sleeve 60 is engaged with the external thread portion 55 of the movable sleeve 50. Consequently, the first axial hole 22 communicates with the second axial hole 52 and the third axial hole 62 to define an open containing room 24 for water storage.

Figure 2:
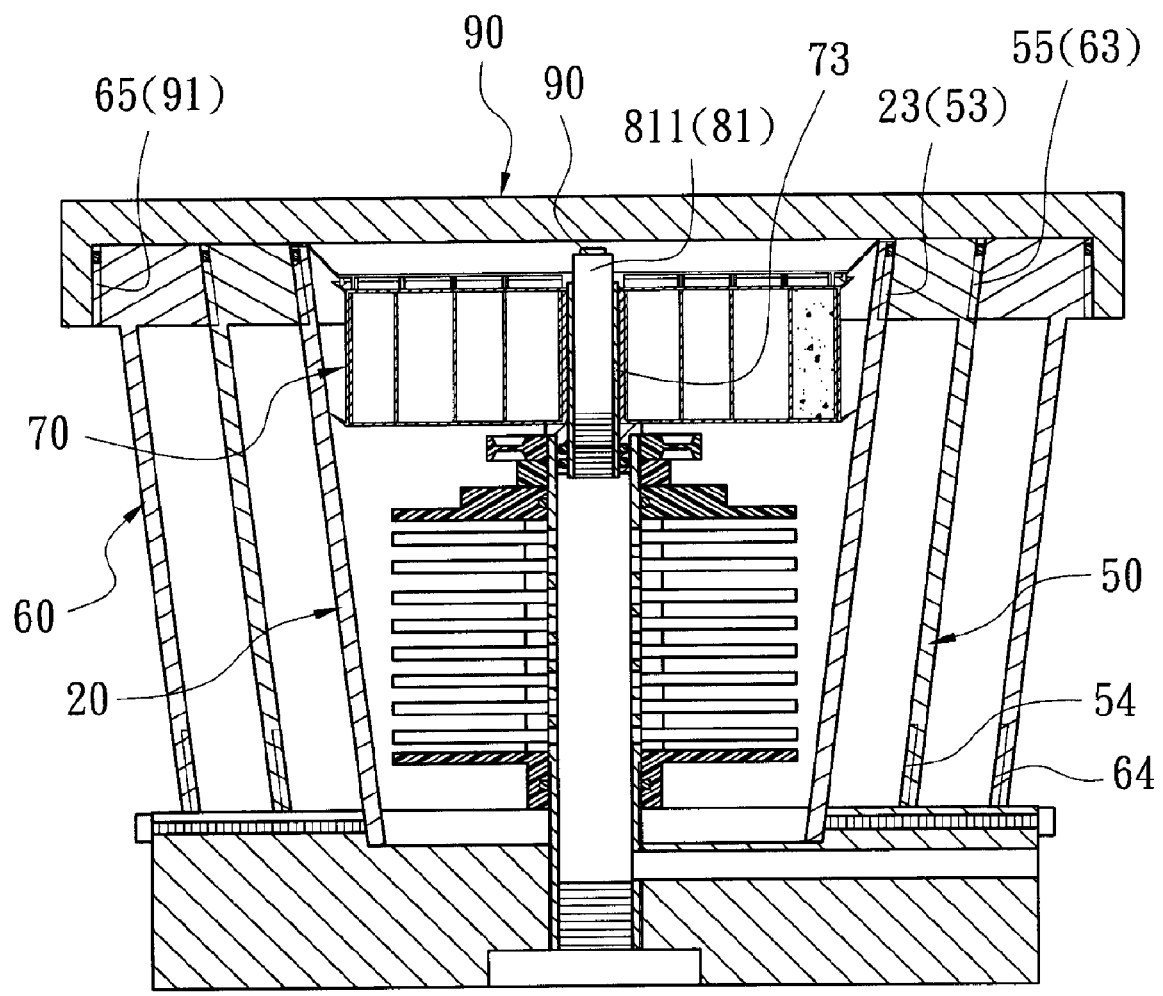
FIG. 2 is a sectional view showing the water purification device in accordance with FIG. 1 in the form of storage situation.

In the second position of storing situation shown in FIG. 2, the internal thread portion 54 of the movable sleeve 50 is disengaged from the external thread portion 23 of the first sleeve 20, and the internal thread portion 64 of the movable sleeve 60 is disengaged from the external thread portion 55 of the movable sleeve 50. In addition, the internal thread portion 53 of the movable sleeve 50 is engaged with the external thread portion 23 of the first sleeve 20, and the internal thread portion 63 of the movable sleeve 60 is engaged with the external thread portion 55 of the movable sleeve 50. As a result, the movable sleeve 50 is stacked adjacent to the first sleeve 20, and the movable sleeve 60 is stacked adjacent to the movable sleeve 50 such that the entire height is reduced for convenient portability.

Besides, the portable water purification device storing situation shown in FIG. 2 further includes a lid 90 covering the layered first sleeve 20, the movable sleeve 50, and the movable sleeve 60 through the engagement between an internal thread portion 91 and the external thread portion 65 of the movable sleeve 60.

Refer to FIG. 1. The pre-filtering unit 70 is set in the containing room 24 and above the filtering unit 40. The pre-filtering unit 70 includes a cartridge 71 demountably coupled on the tube 30, a filtering member 72 received in the cartridge 71, and a central tube 73 set in the cartridge 71.

Figure 3:
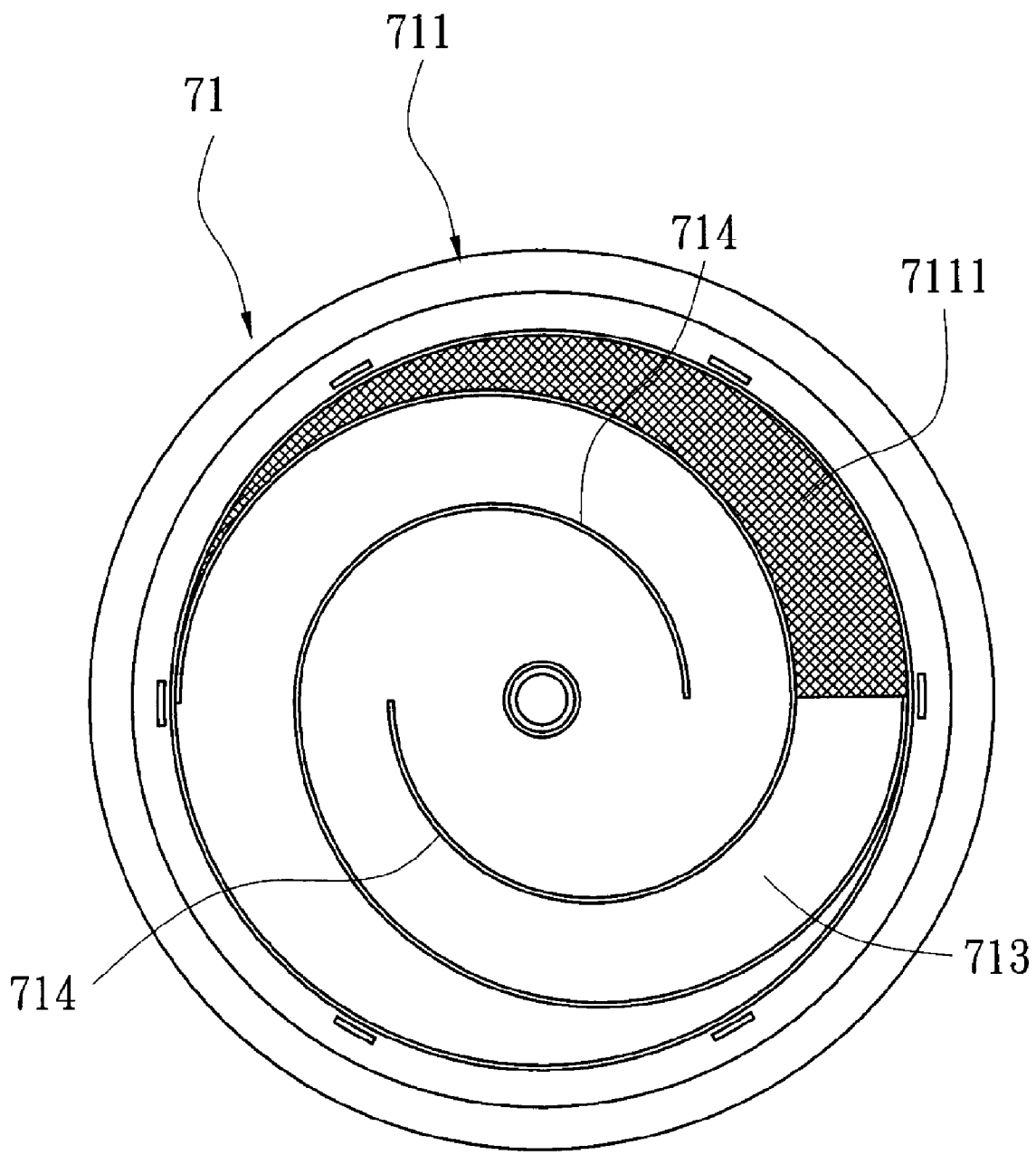
FIG. 3 is a top view of the pre-filtering unit of the water purification device in accordance with FIG. 1.
Figure 4:
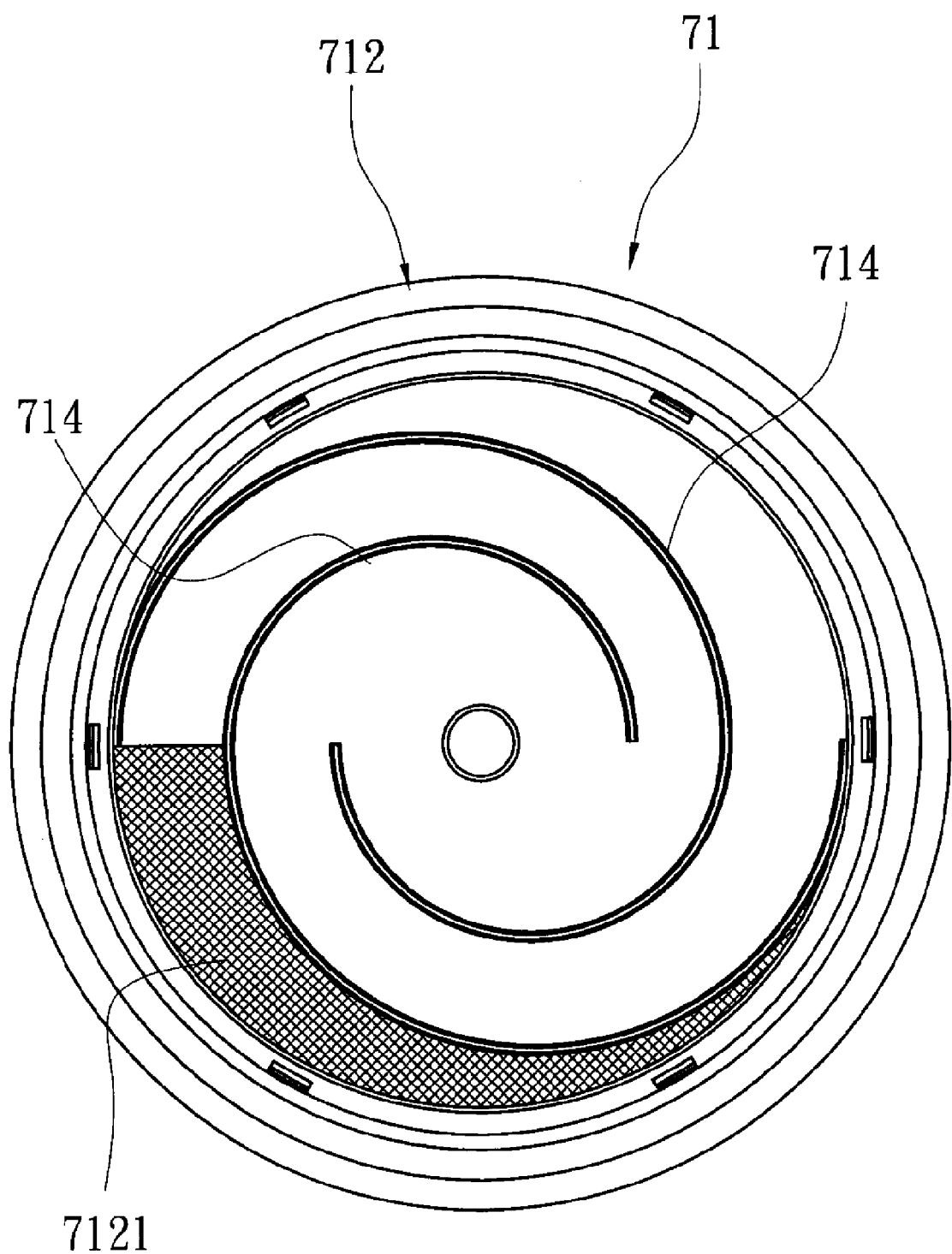
FIG. 4 is a bottom view of the pre-filtering unit of the water purification device in accordance with FIG. 1.

Refer to FIG. 1, FIG. 3 and FIG. 4. The cartridge 71 includes a hollow case 711 with an outlet mesh 7111, a cover 712 with an inlet mesh 7121 concealing the hollow case 711, a room 713 defined by the hollow case 711 and the cover 712, and at least one partition 714 located in the room 713. In this embodiment, the two partitions 714 are spiraled in the cartridge 71 reversely to extend fluid passage, and the outlet mesh 7111 and the inlet mesh 7121 are respectively secured in opposite ends of the passage.

The filtering member 72 is ion-exchange resin, porphyries andesite, activated carbon, non-woven fabric or the combination thereof. In this embodiment, the filtering member 72 includes the activated carbon and the ion-exchange resin. In addition, the filtering member 72 can be replaced by demounting the cartridge 71 and opening the cover 712 to add a new filtering member 72.

As a result, the raw water flows into the room 713 through the inlet mesh 7121 of the cover 712 and then guided along the passage to be pre-filtered by the filtering member 72. After the pre-filtration, the smell, chlorine, trihalomethanes (THMs), organic bacteria, and particle suspension can be eliminated to soften the raw water. The softened water next flows to the first axial hole 22 through the outlet mesh 7111 of the hollow case 711, and is filtered by the membranes 411 of the filtering unit 40 and conducted to the channel 12 of the base 10 by the penetrated hole 33 of the tube 30.

Refer to FIG. 1 and FIG. 2. The exhaust unit 80 is a telescopic tube composed of multiple sections 81 connected and communicated with each other. The bottom section 811 is fastened on and communicated with the central tube 73 of the pre-filtering unit 70. Accordingly, the sections 81 are pulled in series wherein the exhaust hole of the top section 812 is protruded out of the water surface for air exhaust during use. With regard to exhaust unit 80 storage, the top section 812 is pressed by the lid 90 such that the sections 81 are retracted within the bottom section 811.

Figure 6:
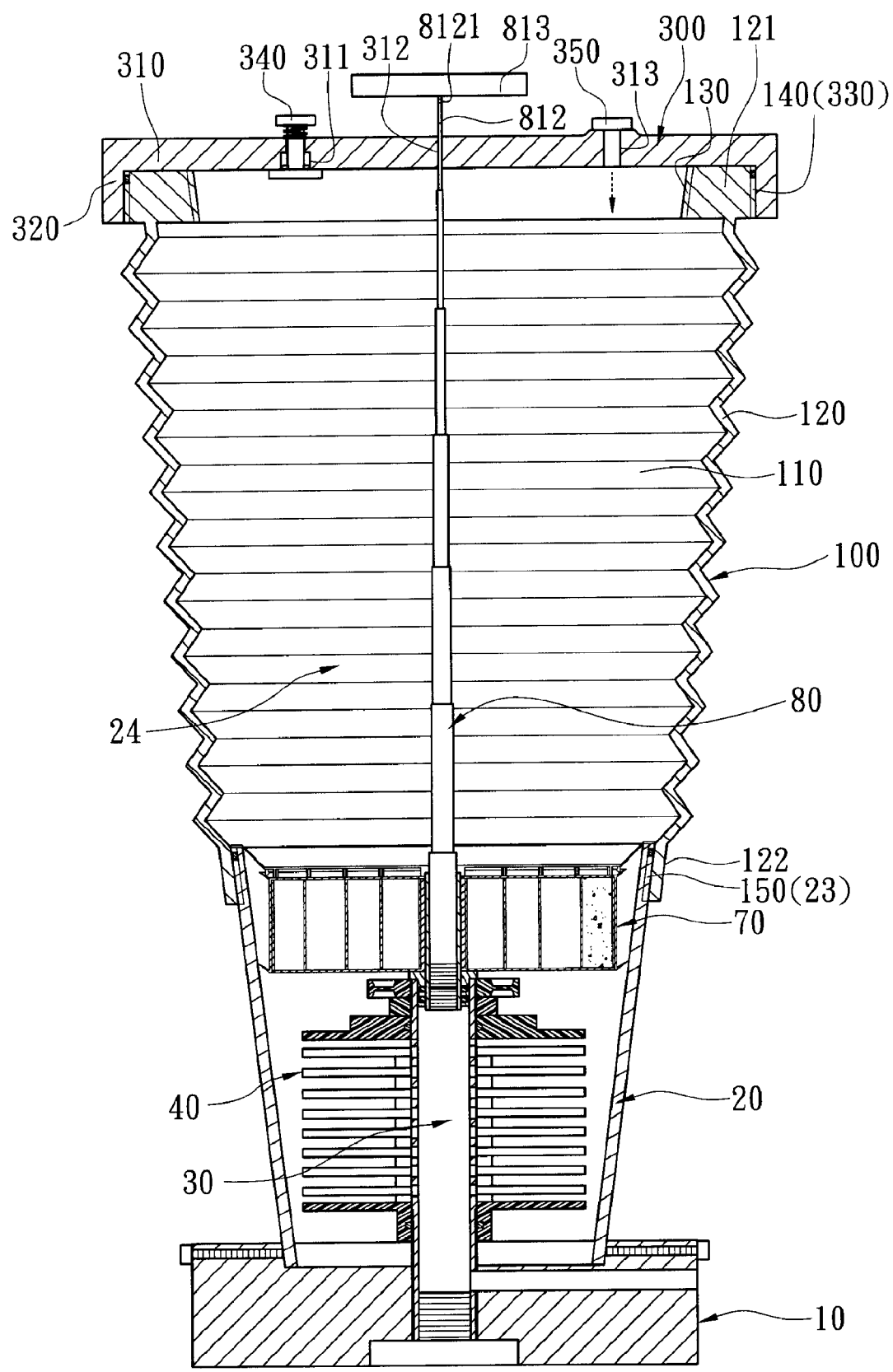
FIG. 6 is a sectional view of a water purification device of a second embodiment in accordance with the present invention.

Refer to FIG. 6. The portable water purification device of the second embodiment includes a base 10, a first sleeve 20, a tube 30, a filtering unit 40, a compressible sleeve 100, a pre-filtering unit 70, an exhaust unit 80, and a lid 300.

In this embodiment, the base 10, the first sleeve 20, the tube 30, the filtering unit 40, and the pre-filtering unit 70 are equal to the first embodiment, so there is no more detailed description.

The compressible sleeve 100 is demountably mounted on the first sleeve 20, and includes a flexible wall 120, a first end 121 and a second end 122, a first internal thread portion 130 and a first external thread portion 140, and a second internal thread portion 150. The flexible wall 120 is around the axis to define a second axial hole 110. The first end 121 and the second end 122 are respectively defined on opposite ends of the flexible wall 120. The first internal thread portion 130 and the first external thread portion 140 are respectively formed on the first end 121 oppositely. The second internal thread portion 150 is formed on the inner surface of the second end 122.

Figure 8:
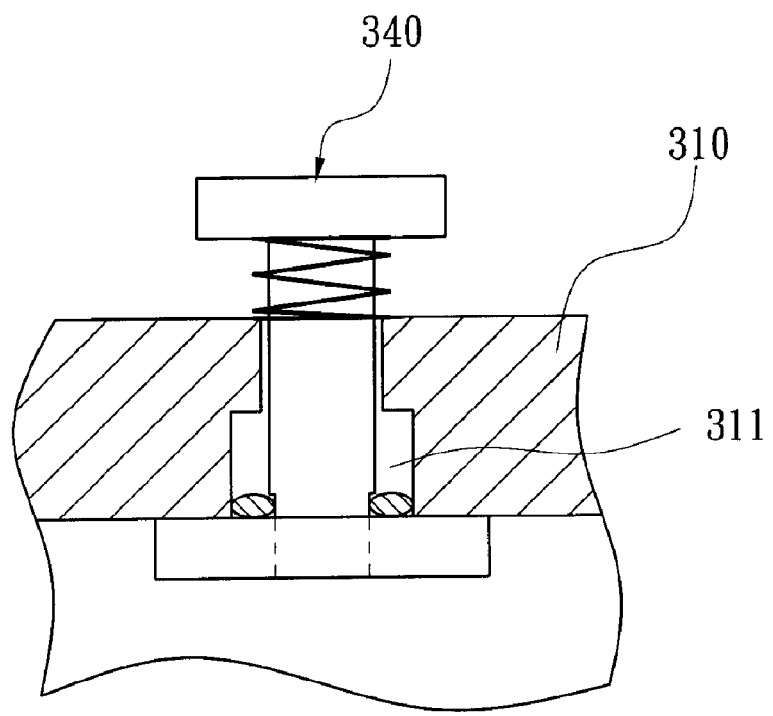
FIG. 8 is a partial sectional view of the pressure valve of the water purification device in accordance with FIG. 6.
Figure 9:
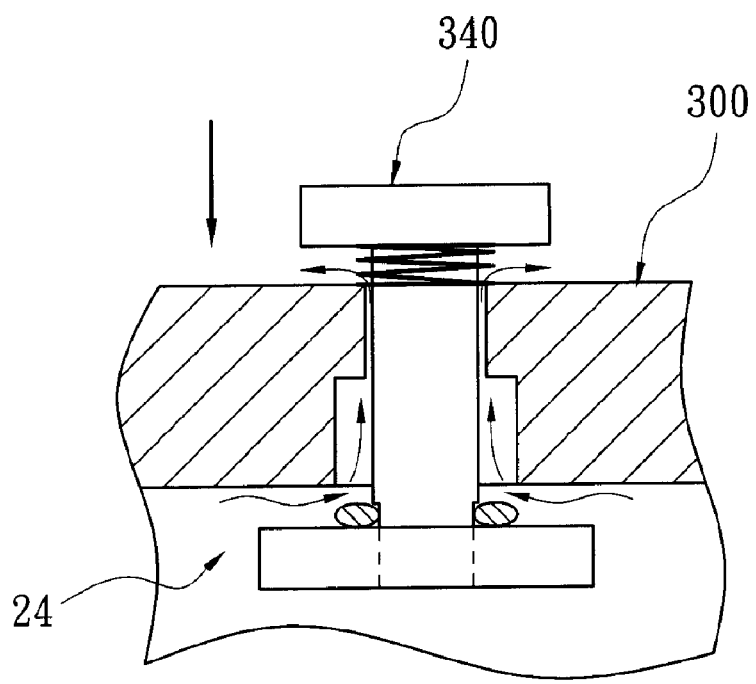
FIG. 9 is a partial sectional view of the pressure valve in accordance with FIG. 6 showing releasing the pressure.

Refer to FIG. 6, FIG. 8 and FIG. 9. The lid 300 includes a disc 310, a circular wall 320 protruded from the disc 310, an internal thread portion 330 formed on the inner surface of the circular wall 320, a pressure valve 340, and a stopper 350. The disc 310 has a cavity 311, a through hole 312, and an inlet 313 wherein the pressure valve 340 is held in the cavity 310. During filtration, the stopper 350 is received in the inlet 313 to keep the containing room 24 sealed. In addition, the top section 812 of the exhaust unit 80 is set through the through hole 312 of the disc 310 with a handle 813 wherein the top section 812 has an exhaust hole 8121 for air exhaust.

During use, the second internal thread portion 150 of the compressible sleeve 100 is engaged with the external thread portion 23 of the first sleeve 20, and the internal thread portion 330 of the lid 300 is engaged with the first external thread portion 140 of the compressible sleeve 100.

After removing the stopper 350 to pour water into the containing room 24 through the inlet 313, pressing the pressure valve 340 to release the pressure in the containing room 24. As a result, pressing the lid 300 to force the flexible wall 120 of the compressive sleeve 100 in a compressed formation such that the raw water in the containing room 24 flows through the pre-filtering unit 70 and the filtering unit 40 to be filtered, and conducted to the channel 12 to draw the filtered liquid.

Figure 7:
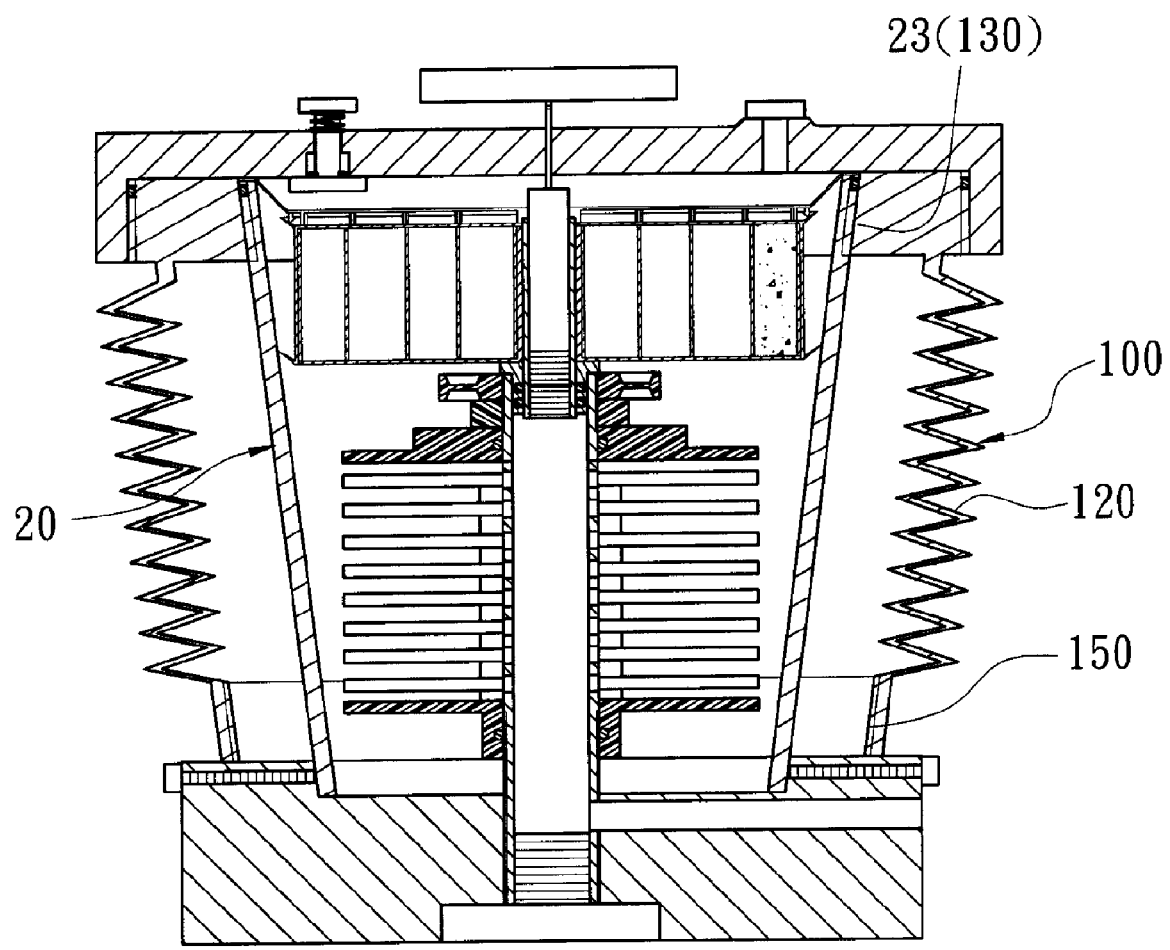
FIG. 7 is a sectional view showing the water purification device in accordance with FIG. 6 in the form of storage situation.

Refer to FIG. 7 in the form of storage wherein the flexible wall 120 is pressed in compression state to encircle the first sleeve 20 wherein the second internal thread portion 150 of the compressible sleeve 100 is escaped from the external thread portion 23 of the first sleeve 20, and the first internal thread portion 130 of the compressible sleeve 100 is engaged with the external thread portion 23 of the first sleeve 20. On the contrary, boosting the compressible sleeve 100 to fasten on the first sleeve 20 by the engagement between the second internal thread portion 150 of the compressible sleeve 100 and the external thread portion 23 of the first sleeve 20 to return to use.

As embodied and broadly described herein, the portable water purification device of the embodiments can be operated without power supply to filter fluid by pump effect. Besides, the raw water is softened by the pre-filtering unit 70 in the first stage, and is filtered by the filtering unit 40 of 0.01 μm bore diameter in the second stage to provide purified liquid. Furthermore, the retractable sleeve is convenient for human to store and carry.

Although the present invention has been described in considerable detail with reference to certain preferred embodiments thereof, other embodiments are possible. Therefore, the spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable water purification device, comprising:
  a base comprising a channel;
  a first sleeve fixed on the base, and comprising a first peripheral wall around an axis to define a first axial hole;
  a tube secured on the base and held in the first axial hole based on the axis to define a penetrated hole communicating with the channel, and comprising an encircled wall and multiple bores defined on the encircled wall and communicating with the penetrated hole;
  a filtering unit comprising multiple filtering bags mounted on the tube wherein each of the filtering bags comprises an intake communicating with the bores; and
  at least one second sleeve mounted on an external surface of the first sleeve to be adjusted between a first position away from the base and a second position adjacent to the base, and comprising a second peripheral wall around the axis to define a second axial hole wherein the first axial hole communicates with the second axial hole to define a containing room when the at least one second sleeve is located on the first position.

2. The device of claim 1, wherein the first peripheral wall comprises a fixed segment and a linked segment respectively defined on opposite ends of the first sleeve wherein the fixed segment comprises a first diameter, and the linked segment comprises a second diameter larger than the first diameter, and a groove being adapted to receive a sealing ring.

3. The device of claim 1, further comprising a lid covering the at least one second sleeve.

4. The device of claim 1, further comprising a pre-filtering unit set in the containing room and above the filtering unit.

5. The device of claim 4, wherein the pre-filtering unit comprises a cartridge demountably coupled on the tube, and a filtering member received in the cartridge.

6. The device of claim 1, further comprising an exhaust unit connected with the tube, and comprising an exhaust pipe extending out of the containing room.

7. The device of claim 6, wherein the exhaust pipe comprises multiple sections connected one by another.

8. The device of claim 1, wherein the first peripheral wall of the first sleeve comprises an external thread portion, and the second peripheral wall of the at least one second sleeve comprises two internal thread portions respectively formed on the opposite ends of the second peripheral wall whereby the at least one sleeve is respectively locked between the first position and the second position through engagement of the external thread portion and the internal thread portions.

9. A portable water purification device, comprising:
  a base comprising a channel;
  a first sleeve fixed on the base, and comprising a first peripheral wall around an axis to define a first axial hole;
  a tube secured on the base and held in the first axial hole based on the axis to define a penetrated hole communicating with the channel, and comprising an encircled wall and multiple bores defined on the encircled wall and communicating with the penetrated hole;
  a filtering unit comprising multiple filtering bags mounted on the tube wherein each of the filtering bags comprises an intake communicating with the bores; and a compressible sleeve demountably mounted on the first sleeve, and comprising a flexible wall around the axis to define a second axial hole, and a first end and a second end respectively defined on opposite ends of the flexible wall whereby the first end is capable of moving forward and away from the second end to provide a compressed formation and a stretched formation wherein the first axial hole communicates with the second axial hole to define a containing room when the compressible sleeve is located in stretched formation.

10. The device of claim 9, further comprising a lid demountably covering the first end of the compressible sleeve.

11. The device of claim 9, further comprising a pre-filtering unit set in the containing room and above the filtering units.

12. The device of claim 9, further comprising an exhaust unit associated with the tube, and comprising an exhaust pipe extending out of the containing room.

* * * * *